US007403511B2

United States Patent
Liang et al.

(10) Patent No.: US 7,403,511 B2
(45) Date of Patent: Jul. 22, 2008

(54) LOW POWER PACKET DETECTOR FOR LOW POWER WLAN DEVICES

(75) Inventors: Jie Liang, Plano, TX (US); Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1344 days.

(21) Appl. No.: 10/283,787

(22) Filed: Oct. 30, 2002

(65) Prior Publication Data
US 2004/0022225 A1 Feb. 5, 2004

Related U.S. Application Data

(60) Provisional application No. 60/400,790, filed on Aug. 2, 2002.

(51) Int. Cl.
*H04Q 7/24* (2006.01)
(52) U.S. Cl. .................. 370/338; 370/278; 370/392
(58) Field of Classification Search ............ 370/338, 370/278, 392
See application file for complete search history.

(56) References Cited

U.S. PATENT DOCUMENTS

| 6,760,671 | B1 * | 7/2004 | Batcher et al. ............. 702/60 |
| 7,062,703 | B1 * | 6/2006 | Keaney et al. ............. 714/807 |
| 7,065,036 | B1 * | 6/2006 | Ryan .......................... 370/208 |
| 2003/0118132 | A1 * | 6/2003 | Williams et al. ............ 375/343 |

\* cited by examiner

*Primary Examiner*—Duc C Ho
(74) *Attorney, Agent, or Firm*—Steven A. Shaw; W. James Brady; Frederick J. Telecky, Jr.

(57) ABSTRACT

A low power packet detector (LPPD) can significantly reduce the average power consumption of WLAN devices. The LPPD takes advantages of 802.11 protocols to turn on and off selected modules of an 802.11 receiver based on the packets on the medium and the decoding stages. The LPPD can be implemented mostly in firmware with minor hardware modifications to existing chips or be implemented in ASIC technology that takes full advantages of the power saving made possible by it.

10 Claims, 2 Drawing Sheets

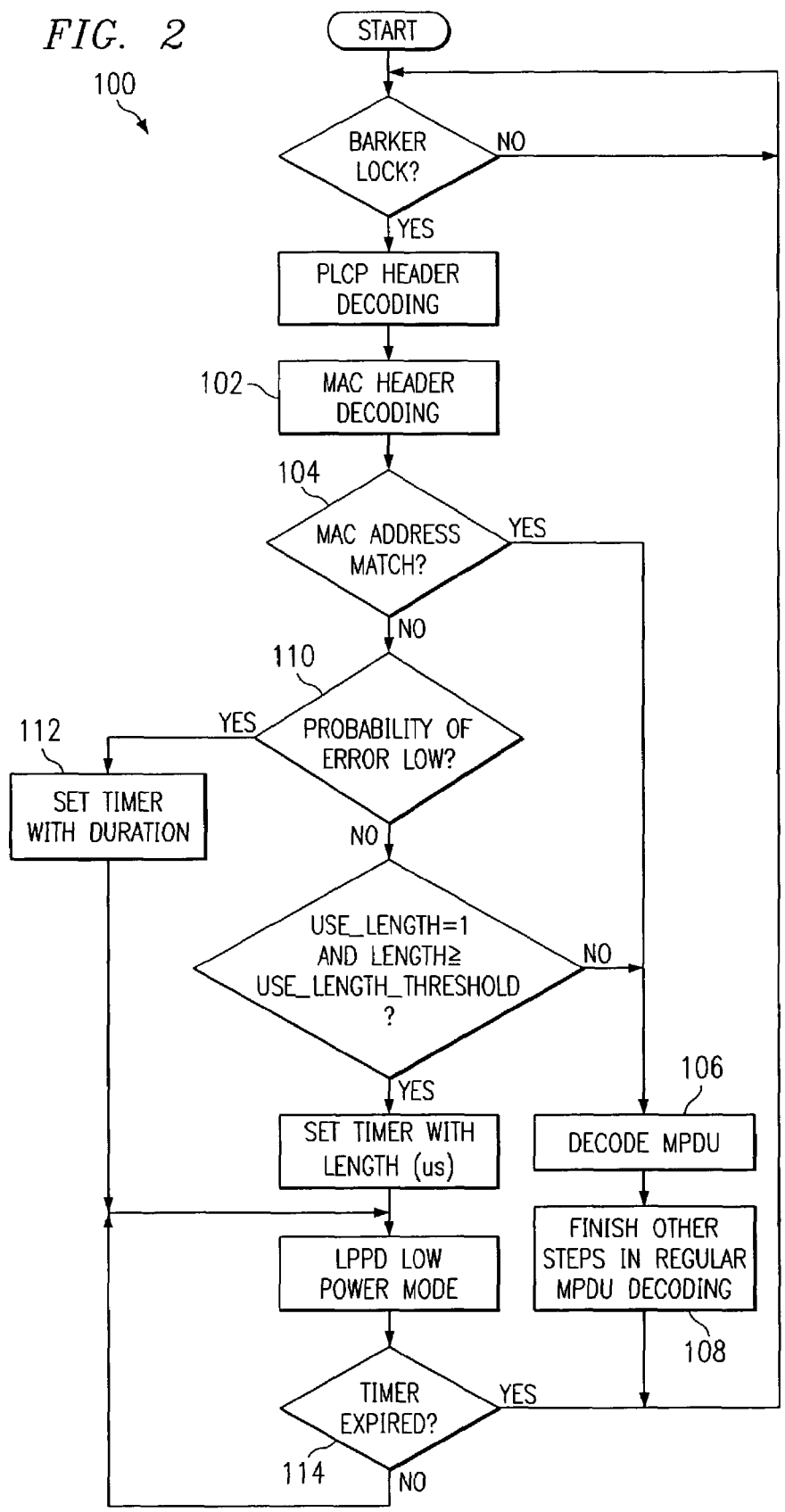

LOW POWER PACKET DETECTOR FOR LOW POWER WLAN DEVICES

CLAIM TO PRIORITY OF PROVISIONAL APPLICATION

This application claims priority under 35 U.S.C. § 119(e)(1) of provisional application serial No. 60/400,790, filed Aug. 2, 2002, by Jie Liang, et al.

BACKGROUND OF THE INVENTION

1. Field of the Invention

This invention relates generally to wireless communication systems, and more particularly, to a low power packet detector for low power wide local area network (WLAN) devices. The invention is particularly useful and relevant to packet based wireless local area networks such as IEEE 802.11-based networks.

2. Description of the Prior Art

Wireless LAN chipsets and equipment have seen a rapid ramp up in revenue and market adoption in the last a few years. So far, the WLAN market has been mostly driven in the corporate market by the laptop users for its convenience of untethered connectivity, and driven in the home market for home networking purposes such as sharing of broadband connections among multiple PCs. The main care-abouts for the laptop and home PC users have been throughput, cost, and coverage. Due to the relatively large capacity of a laptop battery and the low expectations from end users (usually 4-5 hours of uninterrupted usage between charges are acceptable performances), power consumption of WLAN systems has been relatively relaxed compared with their brethrens in cellular wireless markets.

As the WLAN market matures and the cost of WLAN systems rapidly decreases, a lot of interest has been generated regarding the incorporation of WLAN capability into portable devices, notably cell phones and PDAs. Most of these portable devices are battery powered, and end users expect at least a few days of continuous use between battery charges. In addition, the WLAN feature, which provides connectivity for the primary applications such as voice, should not significantly reduce the usage time for the primary applications. The rule of thumb is that a new feature should not reduce battery life by more than 20%. Using the example of a 1500 mAh battery and at least 10 hours of active network connections, one could calculate that the average power consumption for WLAN system should be not more than 100 mW. Considering that today's WLAN system typically has a power consumption of around 700 mW during active usage, there is apparently a lot of work left on the power reduction front.

A more careful study of the usage pattern of most PDA/cell phone data services reveals that the network link is dominated by AP to terminal (downlink) traffic. Most popular applications envisioned for WLAN such as web browsing, email downloading, video streaming and entertainment are all dominated by downlink data traffic. An 802.11b BSS, after removing channel access and collision overhead, has a network maximum capacity between 5-7 Mbps. However, most applications including media heavy applications such as video streaming, rarely require a throughput of more than 1 Mbps at individual terminals. However, the 802.11 MAC protocol is based on the CSMA/CA (carrier sense multiple access with collision avoidance) contention based channel access mechanism, requiring all contending stations decoding all packets on the medium at all time to synchronize and avoid collisions. The side effect is that each WLAN device would be decoding packets at the network throughput, instead of at the data throughput at each terminal. The overhead in power consumption is phenomenal.

In view of the foregoing observations, it is both desirable and advantageous to provide a method that can significantly reduce the effective power consumption of a WLAN terminal device.

SUMMARY OF THE INVENTION

A low power packet detector (LPPD) can significantly reduce the average power consumption of WLAN devices. The LPPD takes advantages of 802.11 protocols to turn on and off selected modules of an 802.11 receiver based on the packets on the medium and the decoding stages. The LPPD can be implemented mostly in firmware with minor hardware modifications to existing chips or be implemented in ASIC technology that takes full advantages of the power saving made possible by it.

According to one embodiment, a method of low power packet detection comprises the steps of scanning an incoming frame at a medium access control (MAC) layer to determine the presence of a valid 802.11b packet; determining the destination of the valid 802.11b packet; and generating instructions to shut down selected LPPD receiver systems when the destination of the valid 802.11b packet is not addressed to a predetermined receiver.

BRIEF DESCRIPTION OF THE DRAWINGS

Other aspects, features and advantages of the present invention will be readily appreciated, as the invention becomes better understood by reference to the following detailed description, when considered in connection with the accompanying drawing figures wherein:

FIG. 2 is a flowchart showing a method of detecting a low power packet for low power WLAN devices according to one embodiment of the present invention;

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
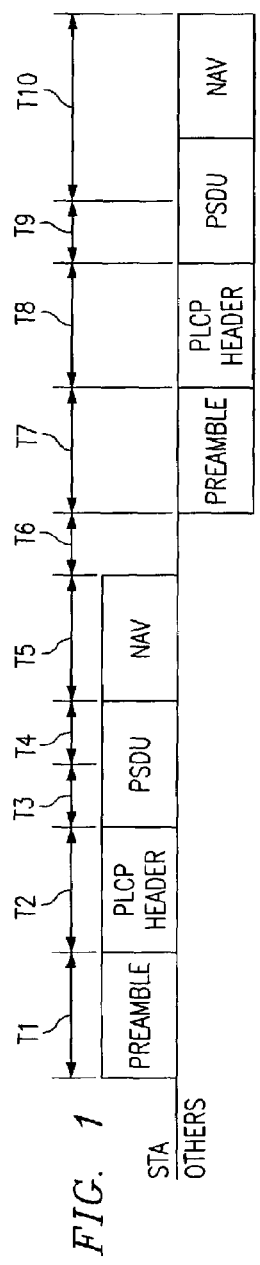
FIG. 1 is a diagram illustrating various stages for a receiver to decode a packet.

FIG. 1 shows the various stages for a receiver to decode a packet and establish a terminal power profile in each of the receiving states according to one embodiment of the present invention. Specifically, a module is utilized to scan for valid 802.11b packets, determine its destination, and shut down most of the system modules when the current packet on the wireless medium is not addressed to itself. This module is essentially a Low Power Packet Detector (LPPD) that serves as an active power regulator for the whole system. Instead of decoding all packets appearing on the air, the system is in active decoding mode only for decoding its own packets, and stays in less active mode to conserve power otherwise. The various stages shown in FIG. 1 can be described as follows:

T1: Receive preamble of a packet addressed to the current station. The receiver looks for Barker lock, estimates channel response, sets equalizer, and corrects for timing and phase errors. The power consumption is $P_{preamble}$.

T2: Decode PLCP header portion of a packet addressed to the current station. The receiver uses Barker decoder to decode PLCP header. The power consumption is $P_{plcp}$.

T3: Decode the MAC header portion of a packet addressed to the current station. The receiver uses Barker, CCK or PBCC decoder. The power consumption is $P_{RX, Barker}$ or $P_{RX, CCK/PBCC}$.

T4: Address matched current station MAC address. Decode the MPDU (Mac Protocol Data Unit) portion of a packet addressed to the current station. The power consumption is $P_{RX}$.

T5: MPDU decoding completed. Depending on the success or failure of the decoding, the station will remain silent, or transmit ACK frame after SIF. Power consumption is $P_{ack}$.

T6: No packet is on the air. The receiver runs the Barker correlator to search for Barker lock.

T7: Receive preamble of a packet addressed to the other stations. The receiver looks for Barker lock, estimates channel response, sets equalizer, and corrects for timing and phase errors. The power consumption is $P_{preamble}$.

T8: Decode PLCP header portion of a packet addressed to the other stations. The receiver uses Barker decoder to decode PLCP header. The power consumption is $P_{plcp}$.

T9: Decode the MAC header portion of a packet addressed to the other stations. The receiver uses Barker, CCK or PBCC decoder. The power consumption is $P_{RX,Barker}$ or $P_{RX, CCK/PBCC}$.

T10: The address decoded does not match the current station MAC address. The receiver looks at the quality metric of the decoded bits. When the quality metric indicates a small error probability, the receiver goes into LPPD power save mode until the NAV period indicated in the MAC header expires. The power consumption is $P_{LPPD}$.

Typically, $P_{LPPD} \leq P_{preamble} \leq P_{plcp} \leq P_{RX, Barker} \leq P_{RX, CCK/PBCC}$. In one application having an RF chain and a PLL, the inventors found $P_{preamble} = P_{plcp} = 350$ mW, and $P_{RX,CCK/PBC} = 787$ mW. The value of $P_{LPPD}$ will then depend on which modules can be turned off during the LPPD power save mode. With the RF chain and PLL turned on, PLPPD would be around 200 mW, but would be below 100 mW if one could selectively turn off the RF portion.

The time distribution of the various states where the receiver stays will depend on the traffic. When the network is highly loaded and the downlink data throughput to the current station is relatively light, the station will spend a majority of the time in state T10, where the power saving potential is the highest.

If the LPPD receiver does not complete the decoding of all the packets on the air, a few issues must be addressed. In the 802.11 MAC protocol, Network Access Vector (NAV) is a virtual carrier sense mechanism to protect the media and reduce interference. Setting the NAV is fundamental to 802.11 MAC operations. In regular receivers (as contrasted with a LPPD based receiver), the correctness of the received packets (including the MAC header that contains the DURATION filed which is used for setting the NAV) is verified through a 32-bit CRC field appended to the end of the MPDU. In an LPPD based receiver, the CRC field would not be received. To avoid setting the NAV to an erroneous value, there is need to verify the correctness of the received MAC header through other means. In this embodiment, the information derived from the received PLCP preamble and header and/or the MAC header is utilized to estimate the probability of erroneously decoding the MAC header bits. The probability that the decoder can successfully decode these bits depends on the characteristics of the channel that the packet was transmitted through and the signal to noise ratio at the receiver (SNR). The probability of erroneously decoding the bits may be estimated using one or more metrics calculated from the PLCP preamble, e.g. SNR, channel response, minimum distance of the concatenated channel code used at the transmitter and the channel response, etc.

Another issue regards EIFS setting when the packet receiving is stopped before reaching end of packet. When the probability of error is low, DIFS instead of EIFS should be used if DCF is used for channel access.

Another option when the probability of error is estimated to be high is to go into low power mode and treat the current packet as an erroneous packet, which dictates the use of EIFS after the end of the current packet. This option would lower the power consumption at the cost of possible more retransmissions and longer channel access delay.

FIG. 2 is a flow chart 100 showing the LPPD receiver methodology according to one embodiment of the present invention. The LPPD receiver process can be implemented with different architectures. When time to market is important and only small hardware changes are desirable, the LPPD receiver process can be implemented using mostly firmware. However, many compromises will be made in a firmware based approach, and significant additional power saving is possible with a more drastic ASIC based approach that takes full advantages of the power savings possible.

Firmware Based Implementation

In this architecture, the firmware will receive a MAC header interrupt immediately after the completion of the MAC header decoding as shown in block 102. An interrupt routine will examine the MAC address as shown in block 104. If the packet is for this station, the receiver continues its normal receiving process as shown in blocks 106 and 108. If the packet is addressed for other stations, the firmware module will make probability assessments as shown in block 110 based on PHY metrics available through register files. If the probability of successful decode is above a threshold, the firmware will set a sleep timer as shown in block 112, and put the receiver into its power saving mode. The timer expires at the end of NAV period and the station is waked up as shown in block 114.

Figure 4:
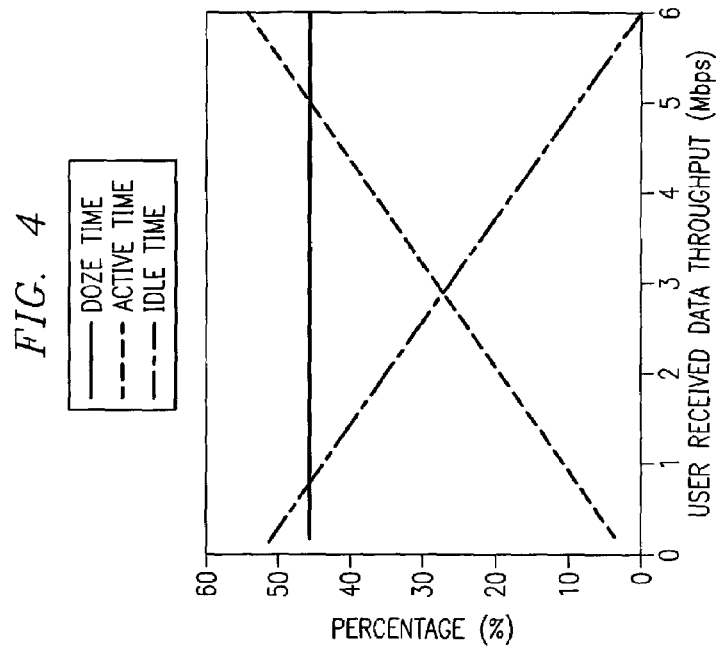
FIG. 4 is a graph illustrating distribution of time in a receiver in both its active and low power packet detection modes.
Figure 3:
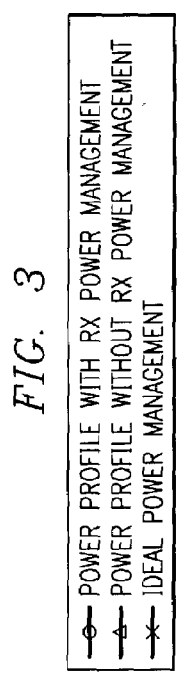
FIG. 3 is a graph illustrating power usage for receivers with and without low power packet detection.

The power consumption of a LPPD based receiver depends on the usage profile and the network traffic load, as stated herein before. Matlab models were used by the present inventors to simulate the performance of a LPPD receiver. FIG. 3 is a graph 200 illustrating simulated power usage for receivers with and without low power packet detection 100; and FIG. 4 is a graph illustrating distribution of time in a receiver in both its active and low power packet detection modes, assuming a loaded network with 6 mbps of effective network total throughput. The downlink throughput to the simulated station varies from 200 kbps to 6 mbps. A nominal packet length of 1500 bytes was also assumed. Also shown in FIG. 3 is the power consumption 202 of an unrealizable ideal receiver with perfect power management. This perfect receiver only wakes up for receiving only its packets. Its power consumption serves as the lower bound for comparisons. Graph line 204 shows the power consumption profile associated with a receiver utilizing LPPD management, while line 206 shows the power consumption associated with a receiver that does not use LPPD management. The simulation results demonstrate the advantages of a LPPD receiver. The key benefit is that the receiver power consumption will now scale linearly with the downloaded data amount, as opposed to a constant power consumption that is much higher on average. FIG. 3 shows that at 200 kbps downloading bandwidth, the LPPD power consumption is 290 mW as opposed to 590 mW without LPPD.

In summary explanation, power consumption is rapidly becoming a major concern for WLAN chip and equipment vendors. LPPD algorithms and implementations have been described that can significantly reduce the average power consumption of WLAN devices. The Low Power Packet Detector (LPPD) takes advantages of 802.11 protocols to turn on and off selected modules of an 802.11 receiver based on the packets on the medium and the decoding stages. LPPD can be implemented mostly in firmware with minor hardware modifications to existing chips or be implemented in ASIC technology that takes full advantages of the power saving made possible by it.

In view of the above, it can be seen the present invention presents a significant advancement in the art of WLAN device power consumption. In view of the foregoing descriptions, it should be apparent that the present invention also represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of low power packet detection in a receiver, the method comprising:
   scanning an incoming frame at a MAC layer to determine the presence of a valid low power packet (a 802.11 b packet);
   determining the destination of the valid low power packet; and
   shutting down selected system modules of the receiver when the destination of the valid low power packet is not addressed to the receiver.

2. The method according to claim 1 wherein scanning an incoming frame at a MAC layer to determine the presence of a valid low power packet comprising:
   searching for a Barker lock;
   decoding a PLCP header portion of the valid low power packet;
   decoding a MAC header portion of the valid low power packet; and
   determining the existence of a predetermined MAC address.

3. The method according to claim 2 wherein shutting down selected system modules of the receiver when the destination of the valid low power packet is not addressed to the receiver comprising:
   determining whether the probability of error in determining the existence of a predetermined MAC address is below a first threshold;
   generating instructions to shut down the selected system modules of the receiver when the probability of error is below the first threshold; and
   shutting down the selected system modules of the receiver when a predetermined packet metric is not below a second threshold and the probability of error is not below the first threshold.

4. The method according to claim 3 further comprising:
   completing normal MPDU decoding when the destination of the valid low power packet is addressed to the receiver; and
   completing normal MPDU decoding when the destination of the valid low power packet is not addressed to the receiver and the predetermined packet metric is below a second threshold and the probability of error is not below the first threshold.

5. A method of low power packet detection, the method comprising:
   scanning an incoming frame associated with a low power wide local area network (WLAN) device to determine the presence of a valid low power packet;
   determining the destination of the valid low power packet; and
   shutting down selected system modules of the WLAN device when the destination of the valid low power packet is not addressed to the WLAN device.

6. The method according to claim 5 wherein scanning an incoming frame associated with the WLAN device to determine the presence of a valid low power packet comprises scanning an incoming frame at a MAC layer.

7. The method according to claim 6 wherein the valid low power packet is a 802.11b-packet.

8. The method according to claim 7 wherein scanning an incoming frame associated with the WLAN device to determine the presence of a valid low power packet comprising:
   searching for a Barker lock;
   decoding a PLCP header portion of the valid low power packet;
   decoding a MAC header portion of the valid low power packet; and
   determining the existence of a predetermined MAC address.

9. The method according to claim 7 wherein shutting down selected system modules of the WLAN device when the destination of the valid low power packet is not addressed to the WLAN device comprising:
   determining whether the probability of error in determining the existence of a predetermined MAC address is below a first threshold;
   shutting down the selected system modules of the WLAN device when the probability of error is below the first threshold; and
   shutting down the selected system modules of the WLAN device when a predetermined packet metric is not below a second threshold and the probability of error is not below the first threshold.

10. The method according to claim 9 further comprising:
    completing normal MPDU decoding when the destination of the valid low power packet is addressed to the WLAN device; and
    completing normal MPDU decoding when the destination of the valid low power packet is not addressed to the WLAN device and the predetermined packet metric is below a second threshold and the probability of error is not below the first threshold.

* * * * *